(12) United States Patent
Isoda

(10) Patent No.: US 6,236,484 B1
(45) Date of Patent: May 22, 2001

(54) INFRARED REMOTE CONTROL CIRCUIT

(75) Inventor: Michio Isoda, Kanagawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/103,901

(22) Filed: Jun. 24, 1998

(30) Foreign Application Priority Data

Jun. 25, 1997 (JP) ................................................ 9-168382

(51) Int. Cl.⁷ .......................... H04B 10/00; H04B 10/10
(52) U.S. Cl. ......................... 359/142; 359/189; 359/194
(58) Field of Search .................................... 359/142, 146, 359/189, 184, 194

(56) References Cited

U.S. PATENT DOCUMENTS

| | | | |
|---|---|---|---|
| 5,351,096 | * | 9/1994 | Park ....................................... 348/734 |
| 5,506,715 | * | 4/1996 | Zhu ........................................ 359/147 |

FOREIGN PATENT DOCUMENTS

| | | |
|---|---|---|
| 60-14103 | 7/1985 | (JP) . |
| 61-41037 | 7/1985 | (JP) . |
| 60-146537 | 8/1985 | (JP) . |
| 60-157345 | 8/1985 | (JP) . |
| 61-284130 | 12/1986 | (JP) . |
| 2-50695 | 2/1990 | (JP) . |
| 5-3588 | 1/1993 | (JP) . |
| 8-18472 | 1/1996 | (JP) . |
| 9-102987 | 4/1997 | (JP) . |
| 97-7611 | 2/1997 | (KR) . |

* cited by examiner

*Primary Examiner*—Leslie Pascal
*Assistant Examiner*—Agustin Bello

(57) ABSTRACT

An infrared remote control circuit comprising an infrared sensing element that receives an infrared modulated wave; an amplifying circuit for amplifying a received signal; a band pass filter that extracts a particular frequency from the received signal amplified by the amplifying circuit; a wave detection circuit for detecting an output signal from the band pass filter; and a waveform shaping circuit for shaping the waveform of an output signal from the wave detection circuit, wherein another wave detection circuit is provided between said first wave detection circuit and the waveform shaping circuit as a second wave detection circuit, and wherein the output from the same current mirror circuit is used as a control signal for both BPF and second wave detection circuit.

5 Claims, 8 Drawing Sheets

(a)

First Off Period | First On Period | Second Off Period | Second On Period | Third Off Period (b)

Q101 Base

Q100 Base (c)

Threshold of hysteresis comparator

Hysteresis

Vdtage of C3

(d)

(a)

First Off Period | First On Period | Second Off Period | Second On Period | Third Off Period (b)

Base of Q100

Base of Q101

(c)

Input of Signal Selecting circuit

Output of Terminal 6

(d)

INFRARED REMOTE CONTROL CIRCUIT

BACKGROUND OF THE INVENTION

1. Field of the Invention

The present invention relates to an infrared remote control circuit, and in particular, to an infrared remote control circuit that can effectively remove noise.

2. Description of the Related Art

Infrared remote control circuits are commonly used to operate remote electronic or electric equipment by means of infrared rays. For example, they are used to switch the channels of a television receiver.

Referencing FIG. 4, a conventional general reception circuit having an infrared remote control circuit is described. This figure is a block diagram showing a conventional general infrared remote control reception circuit.

An infrared remote control system for remote-controlling the switching over the channels of a television receiver is composed of a transmission section (not shown) having an oscillation circuit and an infrared light emitting diode; and a reception section including an infrared remote control reception circuit such as that shown in FIG. 4.

The transmission section oscillates a pulse position modulation (hereafter simply referred to as "PPM") signal provided by discontinuing a carrier of a specific frequency in order to operate the infrared LED to transmit the PPM signal to the reception section as an infrared modulation wave that uses infrared rays as a medium.

The reception section normally comprises an infrared sensing element 1 consisting of a Pin photodiode; an amplifying circuit 2; a band pass filter (hereafter simply referred to as a "BPF") 3 that tunes with a carrier for the PPM signal; a wave detection circuit 4, a waveform shaping circuit 5 including a hysteresis comparator; and an output terminal 6 in order to output a pulse signal depending on whether the carrier for the PPM signal is interrupted.

The PPM signal, which is transmitted as the infrared modulation wave, is received by the infrared sensing element 1 and amplified by the amplifying circuit 2 using an appropriate gain. The BPF 3 removes unwanted signal or noise from the amplified signal, and the wave detection circuit 4 detects a low or a high level depending on whether the carrier for the PPM signal is interrupted. The hysteresis comparator in the waveform shaping circuit 5 shapes an output signal from the wave detection circuit 4, which is then output from the output terminal 6 as a pulse signal that is output depending on whether the carrier for the PPM signal is interrupted.

Referencing FIG. 3, the configuration of a part of the conventional infrared remote control circuit that is located after the BPF 3 is described in detail.

In the BPF 3, a first capacitor C1·7 is connected at one end to an output terminal of the amplifying circuit 2 and at the other end to an input terminal of a first buffer circuit 12 and an output terminal of a first variable transconductance amplifier 11. The first variable transconductance amplifier 11 has a non-inverted and an inverted input terminals.

The output of the first buffer circuit 12 is connected to a non-inverted input terminal of a second variable transconductance amplifier 13 having a non-inverted and an inverted input terminals. An output terminal of the second variable transconductance amplifier 13 is connected to an input terminal of a second buffer circuit 14 and is grounded via a second capacitor C2·8.

An output terminal of the second buffer circuit 14 is connected to an input terminal of the wave detection circuit 4 and to the inverted input terminals of the first and second variable transconductance amplifiers 11 and 13. The non-inverted input terminal of the first variable transconductance amplifier 11 is connected to a positive terminal of a voltage source 113. An output terminal of a current mirror circuit 19 is connected to the first and second variable transconductance amplifiers 11 and 13 to allow currents I1 and I2 to flow as control signals.

The above circuit constitutes the BPF 3 having one end of the first capacitor C·17 as a signal input terminal and the output terminal of the buffer 14 as a signal output terminal.

gm (transconductance) of the first and second variable transconductance amplifiers 11 and 13 used for the BPF 3 is expressed by the following Equation (1).

[Equation 1]

$$gm = \frac{I2}{4 \times KT/q + 2 \times RE \times I1} \quad \text{[Equation 1]}$$

K=Boltzmann's constant
T=Absolute temperature
q=Amount of charges in electrons
RE=Value of resistors R1 and R2
I1=Current value of an control signal from the first variable transconductance amplifier 11
I=Current value of an control signal from the second variable transconductance amplifier 13 gm decreases with increasing I1 (or decreasing I2) while it increases with decreasing I1 (or increasing I2). Hereafter, a lead-in terminal of I1 is referred to as a negative control terminal and a lead-in terminal of I2 is referred to as a positive control terminal of the variable transconductance amplifier.

gm of the variable transconductance amplifiers 11 and 13 can be varied by setting the voltage from the voltage source 113 to fix I1 to an appropriate value while varying the value of the variable resistor R3 to vary the value of I2.

When the capacity values of the first and second capacitors C1·7 and C2·8 are designated as C1 and C2, respectively, and gm of the variable transconductance amplifiers 11 and 13 are indicated as gm1 and gm2, respectively, the tuning frequency $f_0$ (hereafter referred to as $f_0$) of the BPF 3 shown in FIG. 3 can be expressed by Equation (2).

[Equation 2]

$$f_0 = \frac{1}{2\pi\sqrt{C1 \times C2}} \sqrt{gm1 \times gm2} \quad \text{[Equation 2]}$$

$$= \frac{1}{2\pi\sqrt{C1 \times C2}} \times \frac{I2}{4KT/q + 2 \times RE \times I1}$$

The tuning frequency $f_0$ of the BPF 3 can be adjusted by using the variable resistor R3 to control the lead-in current I2 at the positive control terminal of the second variable transconductance amplifier 13.

Conventional infrared remote control reception circuits are generally composed of semiconductor integrated circuits. During an impurity diffusion step in a semiconductor integrated circuit fabrication process, the diffusion of impurities more or less varies, resulting in differences in the values of resistors and capacitors in the semiconductor integrated circuit constituting the infrared remote control circuit. As a result, the tuning frequency $f_0$ of the BPF 3 varies.

As the resistance value varies, the value of I1 on the circuit varies. Since, however, I1 contributes as a product with RE, which is the resistance value of the resistors R1 and R2, as shown in Equation (2) defining $f_0$, it does not substantially vary the value of $f_0$. On the other hand, the variation of the value of I2 directly noticeably varies the value of $f_0$.

Thus, the variable resistor R3 that determines I2 is not provided on the semiconductor integrated circuit but outside it, or if it is provided on the semiconductor integrated circuit, trimming is carried out so that $f_0$ remains unchanged despite the difference in the values of the internal resistors of the semiconductor integrated circuit.

In addition, $f_0$ directly varies if the capacities of the capacitors C1·7 and C2·8 differ. To deal with this problem, the resistor R3 has a variable resistance so that the variation of $f_0$ is compensated for by adjusting the resistance value of the resistor R3 after the diffusion of impurities.

Next, the configuration of the wave detection circuit 4 is described. The output terminal of the BFP circuit 3 is connected to a base of an NPN transistor Q100 and an input terminal of a DC level shift circuit 15. The output of the DC level shift circuit 15 is connected to an input terminal of a low pass filter 16, and an output terminal of the low pass filter 16 is then connected to a base of an NPN transistor Q101.

Emitters of the NPN transistors Q100 and Q101 are connected to output terminals 23.2 and 23.3 of a current mirror circuit 23, respectively. A collector of the NPN transistor Q100 is connected to Vcc, and a collector of the NPN transistor Q101 is connected to an input terminal 17.1 of a current mirror circuit 17.

An output terminal 17.2 of the current mirror circuit 17 is connected to the input terminal of the waveform shaping circuit 5 and the output terminal 23.3 of the current mirror circuit 23, and is grounded via a third capacitor C3.

The above circuit constitutes the wave detection circuit 4.

Next, referencing FIG. 5, the operation of the wave detection circuit 4 is described. FIG. 5(a) shows an example of a PPM signal waveform composed of a first and a second ON time periods having a carrier and a first and a second OFF time periods having only a DC signal. The pulse in the second OFF time period is not a signal but a noise.

The PPM signal shown in FIG. 5(a), which is output by the BPF 3, is input to the wave detection circuit 4 and branches into two paths. One of the paths directly leads to the base of the NPN transistor Q100, and the other path passes through the DC level shift circuit 15, which applies a DC offset to the signal, and then the low pass filter 16, which removes the carrier from the signal, and finally leads to the base of the NPN transistor Q101. FIG. 5(b) shows the waveforms of signals input to the bases of the NPN transistors Q100 and 101, respectively.

The NPN transistors Q100 and Q101 operate as differential switches. When the base potential of the NPN transistor Q100 is lower than the base potential of the Q101, the NPN transistor Q101 is turned on to cause a current to flow through the output terminal 17.2 of the current mirror circuit 17. On the other hand, when the base potential of the NPN transistor Q100 is higher than the base potential of the Q101, the NPN transistor Q101 is turned off to prevent currents from flowing through the output terminal 17.2 of the current mirror circuit 17.

By appropriately increasing a current I4 (hereafter simply referred to as "I4") that starts to flow from the current mirror circuit 17 when the NPN transistor Q101 is turned on, beyond a current I3 (hereafter simply referred to as "I3") flowing through the output terminal 23.3 of the current mirror circuit 23, the capacitor C3 is charged with the differential current between I4 and I3 when the NPN transistor Q101 is turned on, while it is discharged with I3 when the NPN transistor Q101 is turned off.

While the PPM signal is turned on, the charging current that equals the difference between I4 and I3 is higher than the discharge current from I3, so the capacitor C3 provides a high level while repeating charging and discharging in a sawtooth waveform. While the PPM signal is turned off, the capacitor C3 provides a low level using only the discharge current from I3. The charging and discharging voltages are shown by Equations (3) and (4).

$$\text{Charging voltage} = \frac{I4 - I3}{C3} \times \frac{1}{2f1} \quad \text{[Equation 3]}$$

f1: PPM signal carrier frequency
C3: Capacitance value of the capacitor C3

$$\text{Discharging voltage} = \frac{I3}{C3} \times \frac{1}{2f1} \quad \text{[Equation 4]}$$

f1: PPM signal carrier frequency
C3: Capacitance value of the capacitor C3

FIG. 5(c) shows a voltage waveform of the charging and discharging of the third capacitor C3.

A charging and discharging signal from the capacitor C3 is input to the waveform shaping circuit 5, which shapes the waveform by setting the hysteresis width of the hysteresis comparator 18 so that it does not respond to the crest value of the sawtooth waves. Then, the pulse signal shown in FIG. 5(d) which is proportional to the ON time period of the PPM signal is output from the output terminal 6.

In this case, the capacitor C3 is charged and discharged at the voltage defined by Equations (3) and (4). However, when the potential at the capacitor C3 rises to cause the sawtooth wave to exceed the threshold of the hysteresis comparator 18 and if it repeatedly exceeds the threshold, the waveform is broken to cause malfunction.

Thus, conventionally, the same current mirror circuit supplies both the current that defines the carrier frequency f1 (hereafter referred to as "f1") of the PPM signal and the current that defines the hysteresis width, thereby determining the hysteresis width so as to prevent malfunction even if the resistance and capacitance of resistors and capacitors are set at different values during the fabrication of the semiconductor integrated circuit.

The conventional infrared remote control reception circuit has the following problem. Optical noise from an invertor fluorescent lamp or noise in a horizontal-synchronization signal to a television receiver at around 15 kHz appears, as shown in FIG. 5(a), at the output terminal of the BPF 3 as a short noise during the second OFF time period. Then, as shown in FIG. 5(c), this noise appears in the charging and discharging voltage waveform of the capacitor C3 and exceeds the threshold of the hysteresis comparator 18, causing malfunction in which the output is inverted during the OFF time period of the PPM signal as shown in FIG. 5(d).

As a technique for preventing such malfunction, Japanese Patent Application Laid-Open No. 60-141037 and 60-141038 has proposed a circuit such as that shown in FIG. 7.

In the circuit shown in FIG. 7, a noise elimination circuit 17 at which an infrared signal pulse continuously arrives at least twice and which provides output if the pulse interval is longer than or equal to a predetermined value is provided at the output side of the wave detection circuit 10 that detects infrared signal pulses. The noise elimination circuit 17 is provided with a charge/discharge circuit 18 for charging or discharging the capacitor 16 according to the detection output. The output of the charge/discharge circuit 18 is connected to a comparator 20 the output of which is inverted when the terminal voltage of the capacitor 16 exceeds a predetermined level.

According to this circuit configuration, if the carrier frequency f1 input from the terminal 4 continuously arrives as a signal that comprises at least two pulses with a pulse interval longer than or equal to a predetermined time period, a charging and discharging circuit 18 charges and discharges a capacitor 16 in response to a wave detection output. When the voltage at the terminal of the capacitor 16 exceeds a predetermined level, the output from a comparator 20 is inverted.

The time constant for the charging and discharging of the capacitor 16 is set so that discharging is faster than charging if at least two infrared signal pulses of the carrier frequency f1 continuously arrive and if the pulse interval is shorter than or equal to a predetermined time period. This setting enables signals with reduced noise to be output to the output terminal, as shown in FIG. 8D.

BRIEF SUMMARY OF THE INVENTION

Object of the Invention

Even this infrared remote control reception circuit, however, receives as a signal noise that comprises two pulses or more with a pulse interval longer than or equal to a specified value.

It is thus an object of this invention to provide an infrared remote control circuit that can remove noise signals other than the carrier of the PPM signal regardless of the number of pulses.

It is contemplated that the current ratio between charging and discharging may be adjusted to four pulses or more in order to remove noise for two pulses, which creates a problem in the infrared remote control reception circuit in the above publication. This configuration, however, reduces by four pulses the pulse output time proportional to the ON time period of the PPM signal, thereby causing following circuit elements, for example, a microcomputer circuit to malfunction.

The inventor thus has completed this invention by studying an infrared remote control circuit that can remove noise signals other than the carrier of the PPM signal regardless of the number of pulses without reducing the ON time period of the PPM signal from when removing two-pulse noise as in the prior art, and that provides a pulse output time proportional to the ON time period of the PPM signal.

SUMMARY OF THE INVENTION

To achieve this object, an infrared remote control circuit according to this invention comprising an infrared sensing element that receives an infrared modulated wave; an amplifying circuit for amplifying a received signal; a band pass filter (hereafter simply referred to as a "BPF") that extracts a particular frequency from the received signal amplified by the amplifying circuit; a wave detection circuit for detecting an output signal from the BPF; and a waveform shaping circuit for shaping the waveform of an output signal from the wave detection circuit, characterized in that:

another wave detection circuit is provided between the first wave detection circuit and the waveform shaping circuit as a second wave detection circuit, and in that the output from the same current mirror circuit is used as a control signal for both BPF and second wave detection circuit.

Preferably, the second wave detection circuit comprises a frequency selection circuit and a pulse detection circuit, and the waveform shaping circuit comprises a comparator-type waveform shaping circuit.

An output terminal of an input-offset differential circuit in the first wave detection circuit is connected to an input terminal of a frequency selection circuit in the second wave detection circuit, an output terminal of the frequency selection circuit is connected to an input terminal of the pulse detection circuit, an output terminal of the pulse detection circuit is connected to an input terminal of the waveform shaping circuit, a first and a second outputs from the current mirror circuit are connected to the BPF as control signals, and a third output from the current mirror circuit is connected to the frequency selection circuit as a control signal.

A second wave detection circuit is provided between the output terminal of the BPF and the first wave detection circuit to remove unwanted interfering waves.

The second wave detection circuit includes a frequency selection circuit and a pulse detection circuit. The frequency selection circuit transmits as output, only signals of a frequency corresponding to a current that determines the tuning frequency $f_0$ of the BPF. The pulse detection circuit detects as the output from the frequency selection circuit, exact signals the pulse waves of which are input only during the ON time period of the PPM signal.

Thus, the output does not malfunction even if a signal other than the carrier of the PPM signal, for example, noise is input. In addition, even if noise is input that has short pulses of the same frequency as in the carrier of the PPM signal, the pulse detection circuit provides outputs for a pulse period exactly proportional to the ON time period of the PPM signal, thereby preventing following circuit elements, for example a microcomputer, from malfunctioning due to noise.

DETAILED DESCRIPTION OF THE PREFERRED EMBODIMENTS

An embodiment of this invention is specifically described below in detail with reference to the accompanying drawings.

Embodiment

Figure 1:
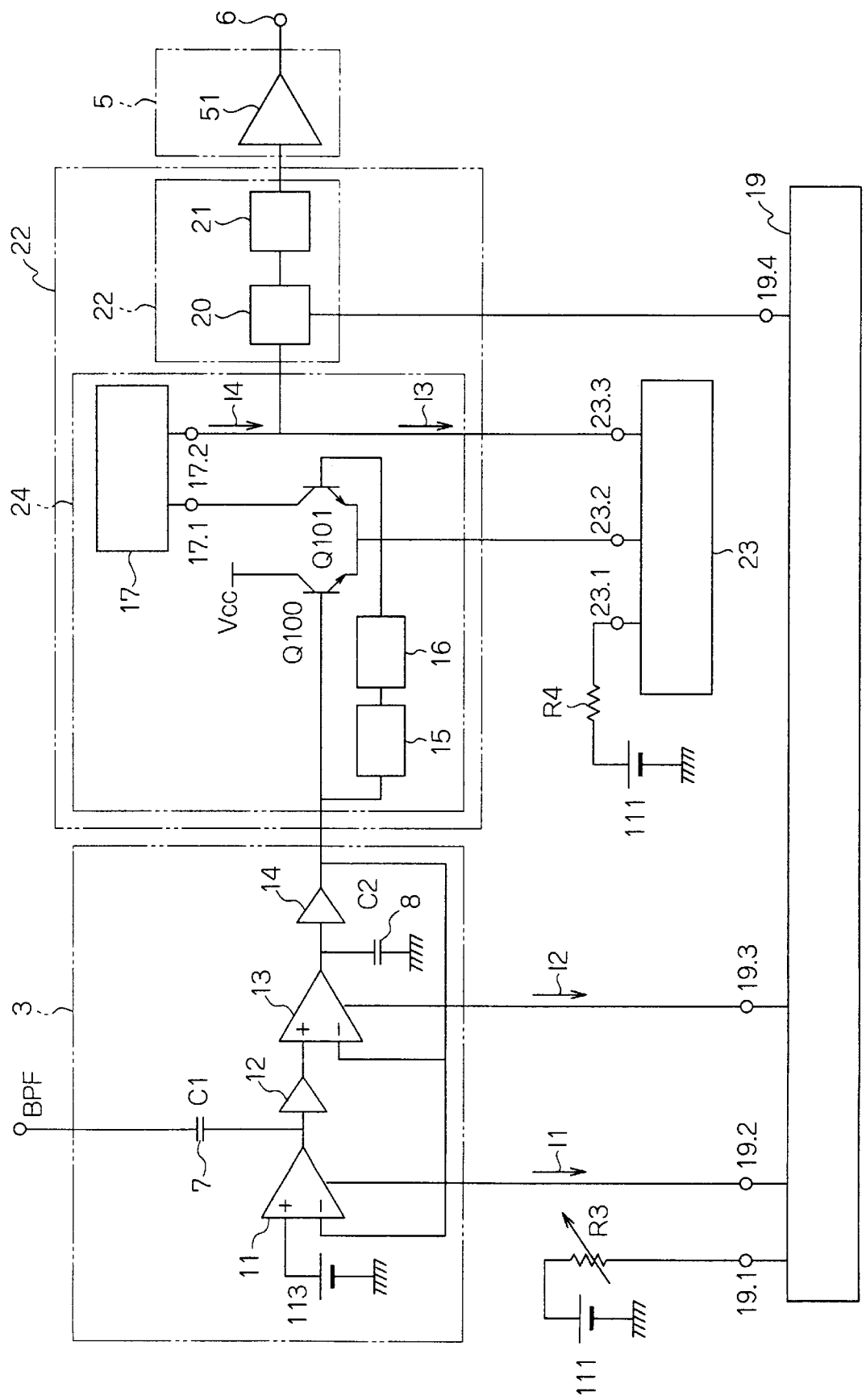
FIG. 1 is a circuit diagram of an infrared remote control circuit according to the present embodiment.

The present embodiment is an example of an infrared remote control circuit according to this invention, and FIG. 1 is a circuit diagram of an infrared remote control circuit according to the present embodiment.

Figure 3:
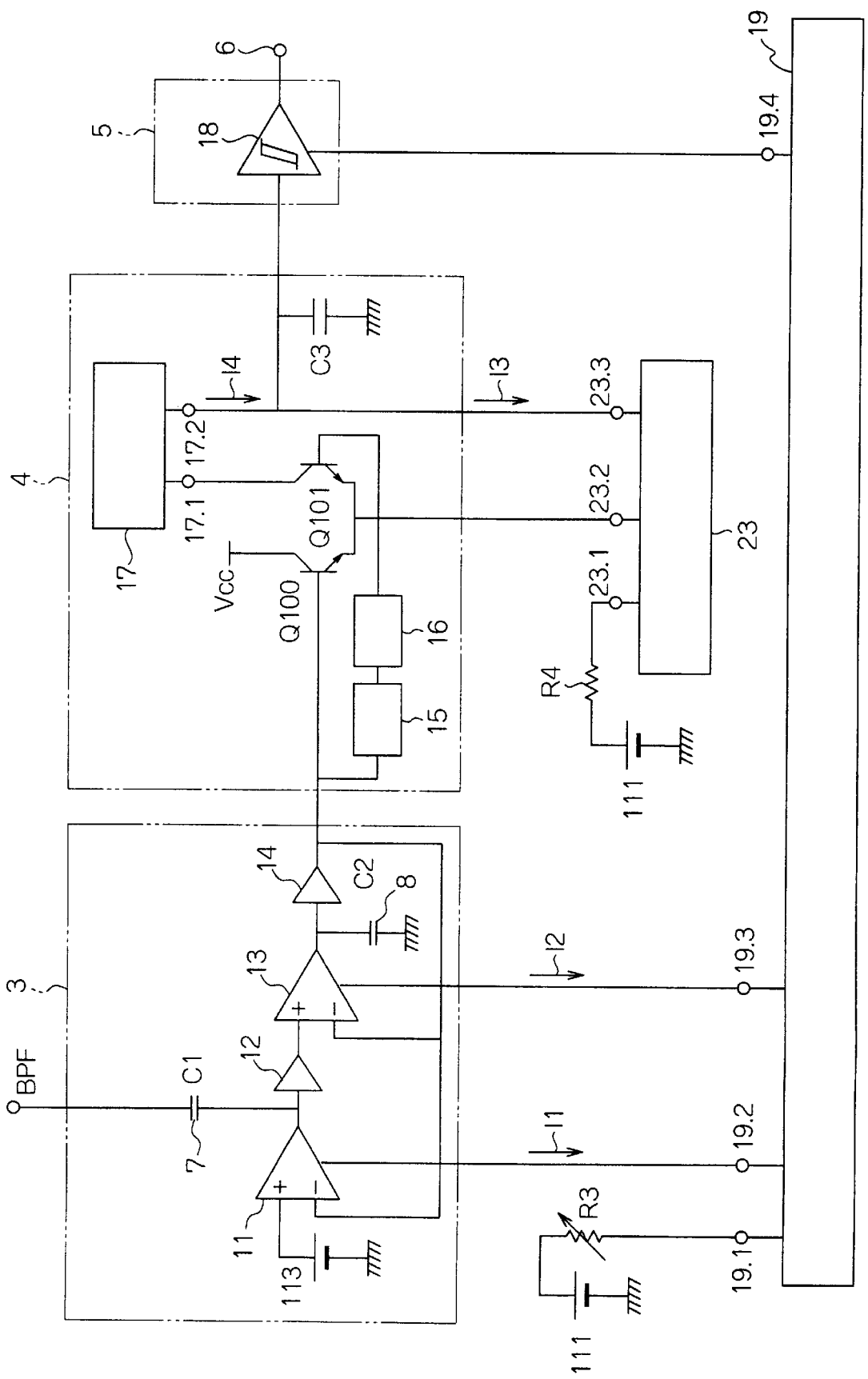
FIG. 3 is a circuit diagram of a conventional infrared remote control circuit.
Figure 4:
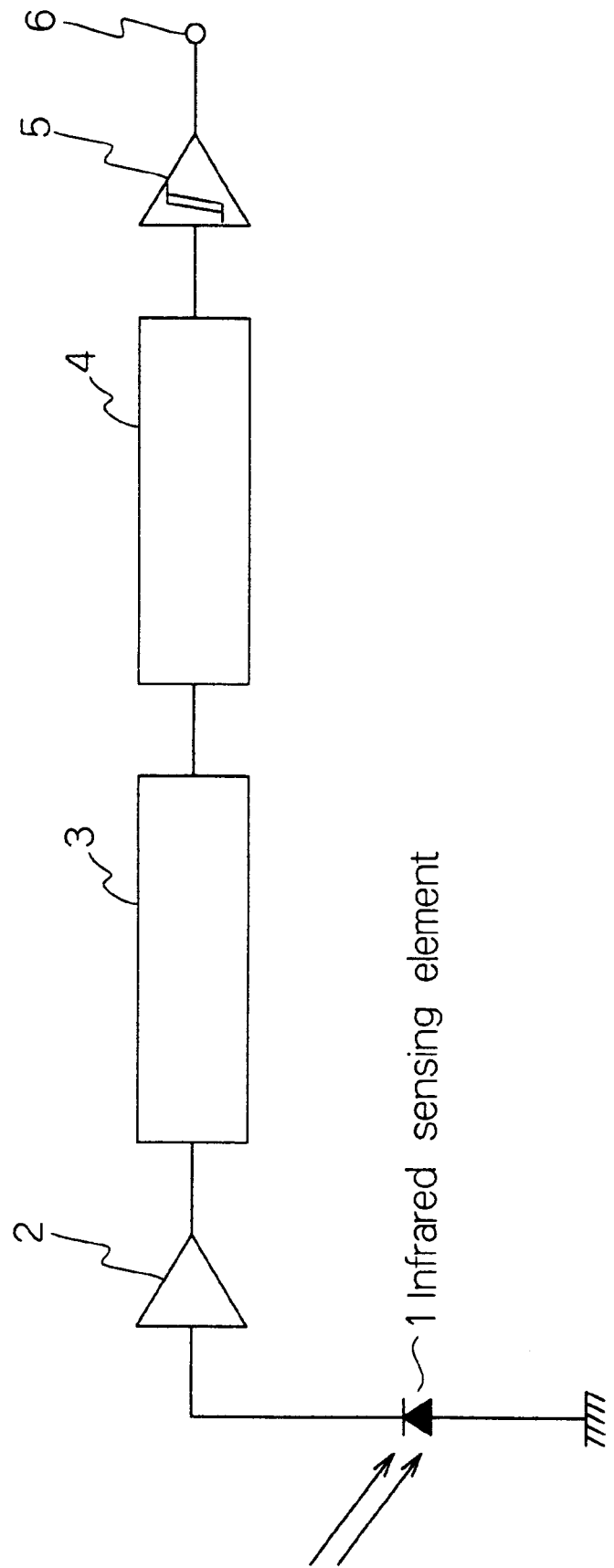
FIG. 4 is a block diagram of an infrared remote control reception apparatus.

The flow of a signal through an infrared reception apparatus having the infrared remote control circuit according to the present embodiment is the same as in the conventional example shown in FIG. 4 except that the wave detection circuit is composed of a first and a second wave detection circuits. According to the present embodiment, the capacitor 3 used to detect envelopes is removed from the wave detection circuit 4 in FIG. 3 and instead a second wave detection circuit 22 is added thereto, as shown in FIG. 1. In addition, the waveform shaping circuit 5 is configured as a comparator-type waveform shaping circuit including a comparator 51.

As shown in FIG. 1, a second wave detection circuit 22 includes a frequency selection circuit 20 for detecting only signals of a frequency corresponding to a current I2 that determines the tuning frequency $f_0$ of the BPF 3; and a pulse detection circuit 21 for detecting as the output from the frequency selection circuit 20, exact signals the pulse waves of which are input only during the ON time period of the PPM signal.

The details and operation of the infrared remote control circuit according to the present embodiment are described below with reference to FIG. 1.

The output terminal of the BPF circuit 3 is connected to the base of the NPN transistor Q100 and the input terminal of the DC level shift circuit 15, as in the conventional example. The output of the DC level shift circuit 15 is connected to the input terminal of the low pass filter 16, and the output terminal of the low pass filter 16 is then connected to the base of the NPN transistor Q101.

The emitters of the NPN transistors Q100 and Q101 are connected to the output terminals 23.2 and 23.3 of the current mirror circuit 23, respectively. The collector of the NPN transistor Q100 is connected to Vcc, and the collector of the NPN transistor Q101 is connected to the input terminal 17.1 of the current mirror circuit 17.

The output terminal 17.2 of the current mirror circuit 17 is connected to an input terminal of the second wave detection circuit 22 and the output terminal 23.3 of the current mirror circuit 23.

The above circuit constitutes a first wave detection circuit 24.

Figure 6:
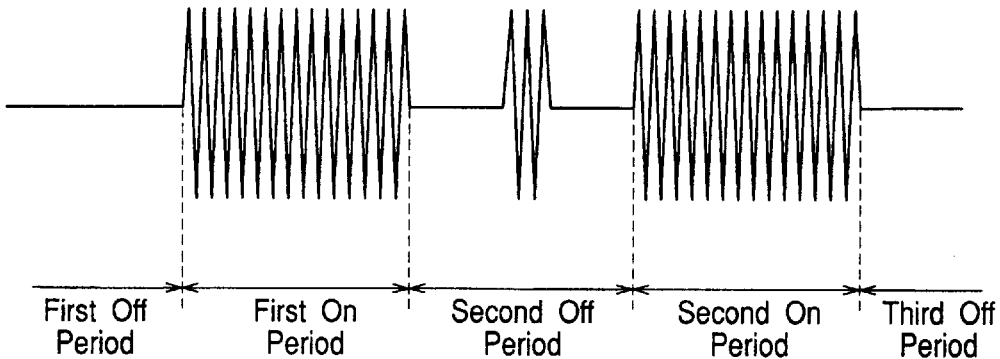
FIG. 6 is an explanatory drawing showing signals from a wave detection and a waveform shaping circuits according to this invention.
Figure 6:
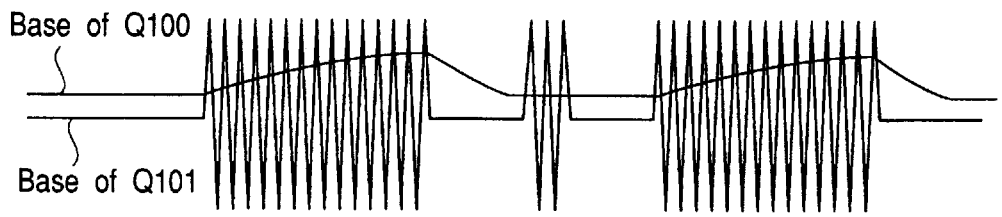
Figure 6:
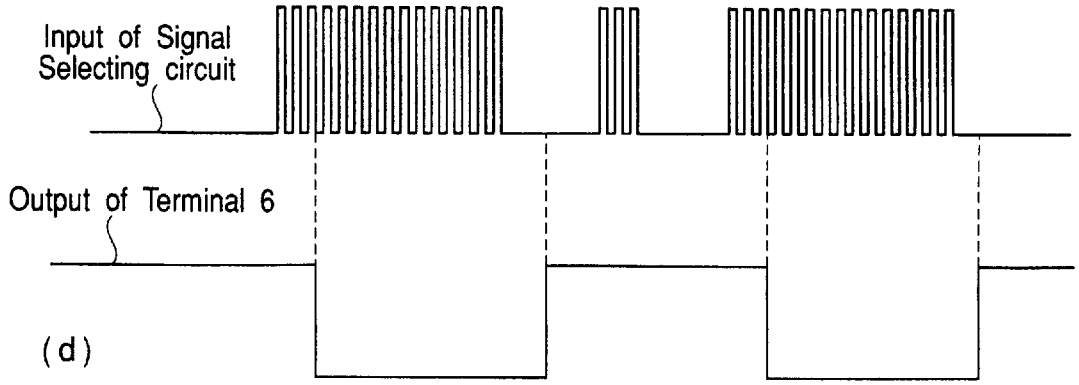
Figure 7:
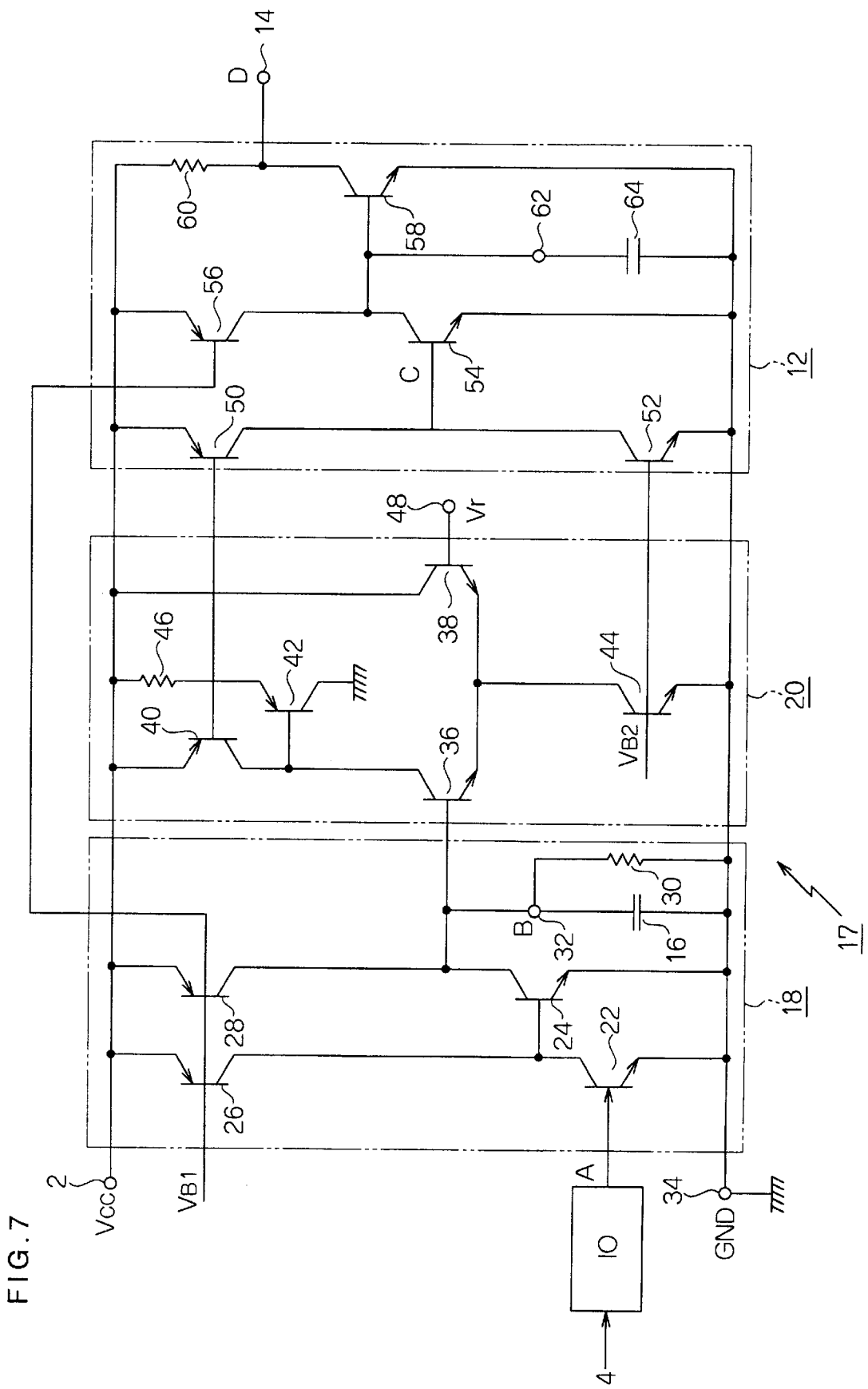
FIG. 7 is a circuit diagram of a conventional infrared remote control circuit.
Figure 8:
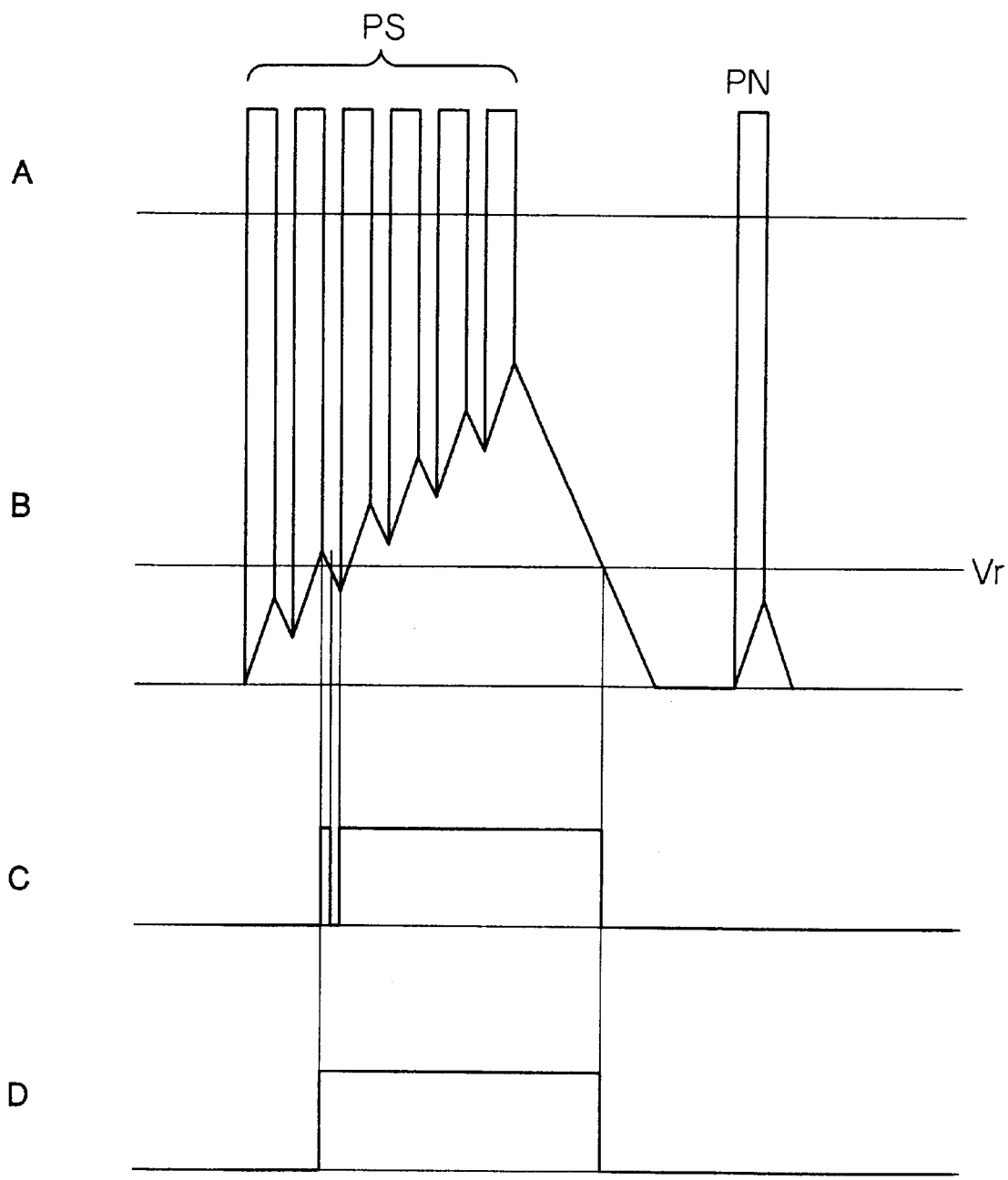
FIG. 8 is an explanatory drawing of conventional signals.

Next, referencing FIG. 6, the operation of the first wave detection circuit 24 is described. FIG. 6(a) shows an example of a PPM signal waveform composed of a first and a second ON time periods having a carrier and a first, a second, and a third OFF time periods having only a DC signal. The pulse in the second OFF time period is not a signal but a noise.

Figure 5:
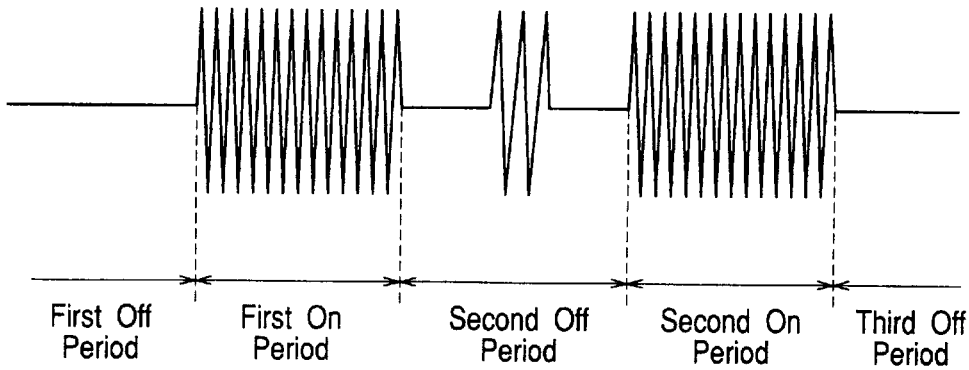
FIG. 5 is an explanatory drawing showing signals from a wave detection and a waveform shaping circuits according to the prior art.
Figure 5:
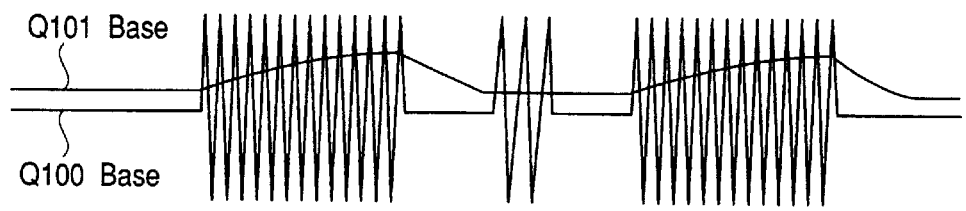
Figure 5:
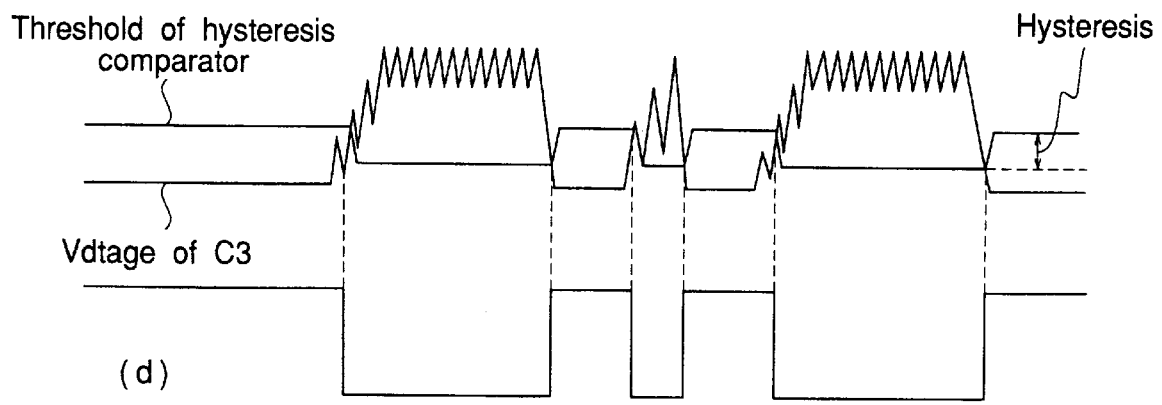

A signal is input to the first wave detection circuit 24 from the output terminal of the BPF 3 and then branches into two paths. One of the paths directly leads to the base of the NPN transistor Q100, and the other path passes through the DC level shift circuit 15, which applies a DC offset to the signal, and then the low pass filter 16, which removes the carrier from the signal, and finally leads to the base of the NPN transistor Q101. FIG. 5(b) shows the waveforms of signals input to the bases of the NPN transistors Q100 and Q101,. respectively.

The NPN transistors Q100 and Q101 operate as differential switches. When the base potential of the NPN transistor Q100 is lower than the base potential of the Q101, the NPN transistor Q101 is turned on to cause a current to flow through the output terminal 17.2 of the current mirror circuit 17. On the contrary, when the base potential of the NPN transistor Q100 is higher than the base potential of the Q101, the NPN transistor Q101 is turned off to prevent currents from flowing through the output terminal 17.2 of the current mirror circuit 17.

A current that starts to flow from the current mirror circuit 17 when the NPN transistor Q101 is turned on is designated as I4 (hereafter simply referred to as "I4"). By appropriately increasing I4 beyond a current I3 (hereafter, simply referred to as "I3") flowing through the output terminal 23.3 of the current mirror circuit 23, a square wave is output that is at a high level during the ON time period of the PPM signal whereas it is at a low level during the OFF time period of the PPM signal, as shown in FIG. 5(c).

This output is input to the second wave detection circuit 22.

Figure 2:
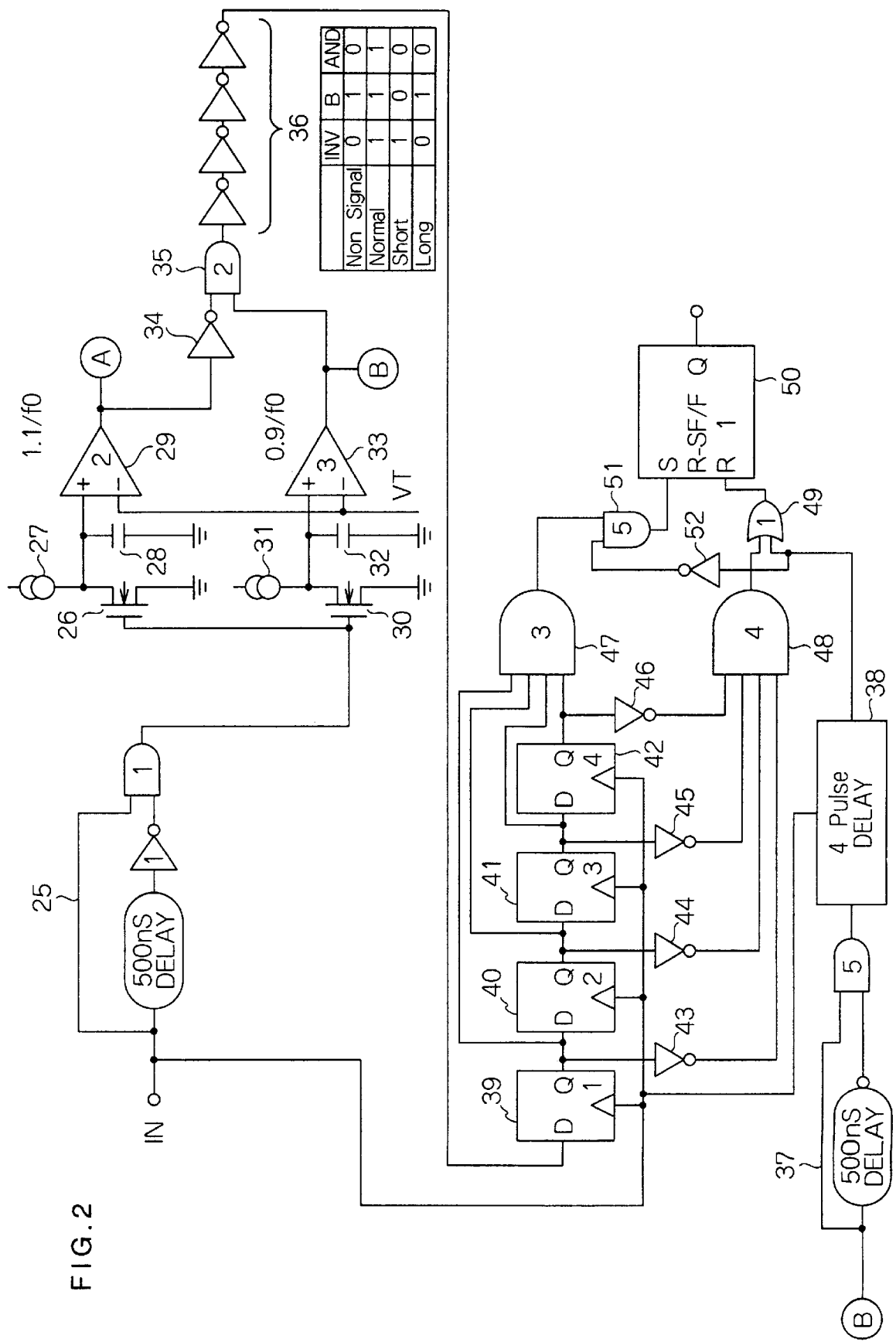
FIG. 2 is a circuit diagram of a second wave detection circuit in the infrared remote control circuit in FIG. 1.

The second wave detection circuit 22 is composed of the frequency selection circuit 20 and the pulse detection circuit 21 as shown in FIG. 1. FIG. 2 shows an example of detailed circuit configuration.

The frequency selection circuit 20 includes a one-shot multivibrator circuit 25 the output from which passes through two paths.

In one path, output from the one-shot multivibrator circuit 25 is connected to a gate of an Nch MOS transistor 26 and passes through a low-frequency selection circuit composed of a constant-current source 27, a capacitor 28, and a comparator 29. In the other path, output from the one-shot multivibrator circuit 25 is connected to a gate of an Nch MOS transistor 30 and passes through a high-frequency selection circuit composed of a constant-current source 31, a capacitor 32, and a comparator 33.

The output from the low-frequency selection circuit is input via an invertor 34 to an AND gate 35, in which it is processed and then input to the pulse detection circuit 21 via a delay circuit 36 or a terminal A. The output from the high-frequency selection circuit is directly input to the AND gate 35, in which it is processed and then input to the pulse detection circuit 21 via the delay circuit 36.

The pulse detection circuit 21 includes four D-type flip-flops (hereafter simply referred to as "D-F/Fs") connected in series 39, 40, 41, and 42, and the output from each D-F/F branches into two paths. In one of the paths, the output from each D-F/F is connected to an AND gate 47, while in the other path, the output from each D-F/F is connected to an AND gate 48 via invertors 43 to 46.

Furthermore, the pulse detection circuit 21 is configured so that an output signal that is directly input to the one-shot multivibrator circuit 37 from the low-frequency selection circuit and that exits a pulse delay circuit 38; an output signal from the AND gate 47; and an output signal from the AND gate 48 are input to and processed by a circuit composed of an AND gate 51, an invertor 52, an OR gate 49, and an R-S-type flip-flop 50.

Referencing FIG. 6, the operation of the second wave detection circuit 22 is described. The signals and noise during the ON time period of a PPM signal output from the first wave detection circuit 24 are input to the second wave detection circuit 22 as a waveform such as that shown in FIG. 6(c).

Then, in the second wave detection circuit 22, the low- and high-frequency detection circuits detect low and high frequencies to split the signal into low and high frequencies in order to detect only the carrier (for example, 38 kHz) of the PPM signal. Since the constant-current sources 27 and 31 are proportional to I2 that determines the tuning frequency $f_0$ of the BPF 3, the comparators 29 and 33 can accurately detect the charging time for the-capacitors 28 and 32.

The pulse detection circuit 21 sets the output at a low level on detecting that this signal has been input as pulses the number (in FIG. 6(d), four) of which is determined by the number of D-F/Fs, while on detecting the end of the ON time period of the PPM signal, it sets the output at a high level after the pulse delay circuit 38, which delays a signal by a number of pulses determined by a time constant in a CR, has delayed the signal by four pulses.

The waveform of a signal output from the output terminal 6 is as shown in FIG. 6(d).

As described above, the wave detection circuit is composed of the frequency selection circuit 20 and the pulse detection circuit 21, and an output terminal 19.4 of the current mirror circuit 19 is configured as the constant-current sources 27 and 31 for the frequency selection circuit 20.

This configuration allows the value of the current from the constant-current sources 27 and 31 to correspond to I2 that determines $f_0$ of the BPF 3 and removes signals other than the carrier of the PMM signal, thereby enabling the removal of short-pulse noise such as optical noise from an invertor fluorescent lamp or noise in a horizontal-synchronization signal to a TV at around 15 kHz.

In addition, this invention prevents following circuit elements such as a microcomputer from malfunctioning due to the effect on regular signals provided when the pulse output time proportional to the ON time period of the PPM signal is reduced by four pulses, as in the prior art.

According to this invention, the second wave detection circuit is provided between the first wave detection circuit and the waveform shaping circuit, the output from the same current mirror circuit is used as a control signal for both BPF and second wave detection circuit, and the second wave detection circuit is composed of the frequency selection circuit and the pulse detection circuit. Thus, this invention can remove signals other than the carrier of the PPM signal, such as optical noise from an invertor fluorescent lamp or noise in a horizontal-synchronization signal to a TV at around 15 kHz in order to output noiseless signals. In addition, this invention prevents regular signals from being affected when the pulse output time proportional to the ON time period of the PPM signal is reduced by four pulses, as in the prior art.

The invention may be embodied in other specific forms without departing from the spirit or essential characteristic thereof. The present embodiments is therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 9-168382 (Filed on Jun. 25, 1997) including specification, claims, drawings and summary are incorporated herein by reference in its entirety.

What is claimed is:

1. An infrared remote control circuit comprising an infrared sensing element that receives an infrared modulated wave; an amplifying circuit for amplifying a received signal; a band pass filter that extracts a particular frequency from the received signal amplified by the amplifying circuit; a wave detection circuit for detecting an output signal from the band pass filter; and a waveform shaping circuit for shaping the waveform of an output signal from the wave detection circuit, wherein:

another wave detection circuit is provided between said first wave detection circuit and the waveform shaping circuit as a second wave detection circuit, and wherein the output from a same current mirror circuit is used as a control signal for both the band pass filter and the second wave detection circuit.

2. An infrared remote control circuit according to claim 1 wherein the second wave detection circuit comprises a frequency selection circuit and a pulse detection circuit, the waveform shaping circuit comprising a comparator-type waveform shaping circuit, and wherein an output terminal of an input-offset differential circuit in the first wave detection circuit is connected to an input terminal of a frequency selection circuit in the second wave detection circuit, an output terminal of the, frequency selection circuit being connected to an input terminal of the pulse detection circuit, an output terminal of the pulse detection circuit being connected to an input terminal of the waveform shaping circuit, a first and a second output terminal of the current mirror circuit being connected to the band pass filter for controlling, a third output terminal of the current mirror circuit being connected to the frequency selection circuit for controlling.

3. An infrared remote control circuit according to claim 2 wherein an output signal from the first wave detection circuit is input to a one-shot multivibrator circuit, wherein an output signal from the one-shot multivibrator circuit is input to the frequency selection circuit in the second wave detection circuit, and wherein an output signal from the frequency selection circuit is input to the pulse detection circuit via a delay circuit.

4. An infrared remote control circuit according to claim 2 wherein an output signal from the first wave detection circuit is input to a one-shot multivibrator circuit, wherein an output signal from the one-shot multivibrator circuit is input to the frequency selection circuit in the second wave detection circuit, and wherein an output signal from the frequency selection circuit is input to the pulse detection circuit.

5. An infrared remote control circuit according to claim 2 wherein the pulse detection circuit comprises four D-type flip-flops connected in series, wherein in one of paths, output from each D-type flip-flops is input to a first AND gate through first paths, while the output is input to a second AND gate via an invertor through second paths, wherein:

output from a pulse delay circuit to which the output from the frequency selection circuit is input, output from the first AND gate, and output from the second AND gate are input to a circuit comprising an AND gate, an OR gate, and an R-S-type flip-flop, and wherein:

an output signal from the R-S-type flip-flop is input to the waveform shaping circuit.

* * * * *